W. H. Bechtel,
Boring Artesian Wells.
N° 48,012. Patented May 30, 1865.
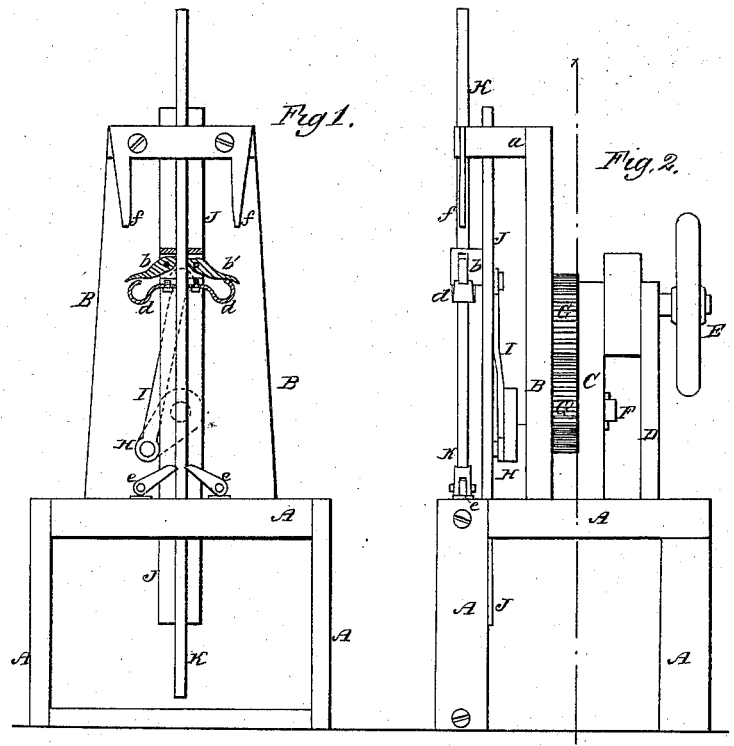
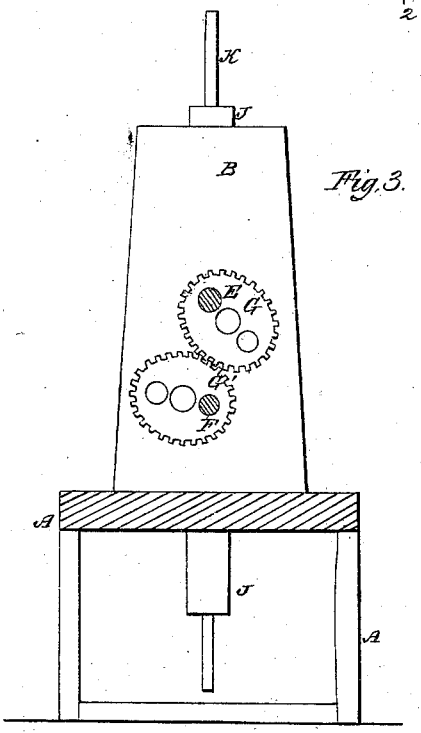
Witnesses.
Inventor.

UNITED STATES PATENT OFFICE.

WM. H. BECHTEL, OF PHILADELPHIA, PENNSYLVANIA, ASSIGNOR TO HIMSELF AND B. H. BARTOL, OF SAME PLACE.

IMPROVEMENT IN BORING WELLS.

Specification forming part of Letters Patent No. 48,012, dated May 30, 1865.

*To all whom it may concern:*

Be it known that I, WM. H. BECHTEL, of Philadelphia, Pennsylvania, (assignor to myself and B. H. BARTOL, of the same place,) have invented certain Boring and Pumping Mechanism for Artesian Wells; and I do hereby declare the following to be a full, clear, and exact description of the same, reference being had to the accompanying drawings, and to the letters of reference marked thereon.

My invention consists in the use, substantially as described hereinafter, of elliptical or oval cog-wheels, in combination with the bar or rope used in boring Artesian wells, and with the mechanism hereinafter described, or the equivalent to the same, for seizing and releasing the said bar or rope.

The object of my invention is to obtain, by the aid of the elliptical wheels, a differential reciprocating motion for economizing power and saving time in boring Artesian wells, and in raising fluid from the same.

In order to enable others skilled in the art to make and use my invention, I will now proceed to describe the manner of carrying it into effect.

On reference to the accompanying drawings, which form a part of this specification, Figure 1 is a front view of my improved boring and pumping mechanism for Artesian wells; Fig. 2, a side view of the same, and Fig. 3 a vertical section on the line 1 2, Fig. 1.

Similar letters refer to similar parts throughout the several views.

A is a substantial wooden frame, to which are secured the three standards B, C, and D, and in the latter turn the two shafts E and F, which are geared together by means of the elliptical or oval wheels G and G'. To the shaft F is secured a crank, H, the pin of which is connected by a rod, I, to a pin at the rear of the vertical sliding bar J, the latter, as well as a round rod, K, passing through and being guided by the frame A, and by a projection, $a$, at the upper end of the standard B. To the sliding bar J are hung the two dogs or levers $b$ and $b'$, one on each side of the bar K, against which the short arms of the levers are forced by springs $d$ $d$, acting against the under side of the long arms, and secured to a projection on the said sliding bar J. The connecting-rod of a small engine may be coupled directly to a crank on the shaft E; or the latter may be furnished with a suitable pulley for receiving a driving-belt. As the shaft E revolves with a uniform motion, it will communicate, through the elliptical wheels G G', a differential rotary motion to the shaft F, and these wheels are so arranged in respect to each other and to the crank H, which operates the sliding bar J, that the greatest leverage is exerted in elevating the said bar with a slow motion, and a lesser leverage in lowering the bar with a much more rapid motion.

As the sliding bar commences its upward movement the dogs or levers $d$ and $d'$ seize the bar K, which is consequently elevated simultaneously with the sliding bar until the long arms of the dogs come in contact with the projections $ff$ on the standard B, when the long arms of the dogs are depressed and the rod K (released from the control of the short arms) falls by its own weight and that of the boring-rod and tool attached to the said bar. Immediately after this the sliding bar descends with rapidity, the boring-bar is again seized by the dogs, and elevated and released as before. Suitable dogs, $e$ $e$, are so hung to the frame that they will serve to sustain the bar when a cessation of its movements becomes necessary.

Economy, as regards expenditure of power and consumption of time, must result from the above-described use of the elliptical wheels, inasmuch as the greater force is exerted in accomplishing the most severe duty of slowly raising the heavy boring-bar and slide and the lesser force in performing the lighter duty of lowering the slide rapidly.

In the oil regions it is the general practice to bore Artesian wells with a tool attached to a rope, which may take the place of the bar K in the above-described machine, the dogs $b$ and $b'$ being so adapted to the rope as to seize and release the same.

When this mechanism has to be used for pumping fluids from Artesian wells, the bar K or the rope may be removed and the pump-rods connected directly to the sliding bar J; or the latter and the rod I may be disconnected from the crank and the pump-rods connected directly to the crank-pin.

As the power required to elevate the rods and the fluid is much greater than that necessary for depressing the same, the advantages of the above-described mechanism for pumping purposes will be apparent.

I claim as my invention and desire to secure by Letters Patent—

The use, substantially as and for the purpose described, of elliptical or oval cog-wheels, in combination with a well-boring bar or rope, and with the mechanism described, or the equivalent to the same, for seizing and releasing the said bar or rope.

In testimony whereof I have signed my name to this specification in the presence of two subscribing witnesses.

WM. H. BECHTEL.

Witnesses:
C. B. POTTENGEE,
JOSEPH A. TURNBULL.